(12) United States Patent
Silverbrook

(10) Patent No.: US 6,416,160 B1
(45) Date of Patent: Jul. 9, 2002

(54) COMPACT PRINTER SYSTEM AND NOVEL CAPPING MECHANISM

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/575,194

(22) Filed: May 23, 2000

(30) Foreign Application Priority Data

May 25, 1999 (AU) .............................................. PQ0560

(51) Int. Cl.⁷ ................................................ B41J 2/165
(52) U.S. Cl. ........................................................ 347/32
(58) Field of Search ............................... 347/32, 29, 31

(56) References Cited

U.S. PATENT DOCUMENTS

| | | | | |
|---|---|---|---|---|
| 4,543,589 A | * | 9/1985 | Terasawa ........................ | 347/31 |
| 5,040,000 A | * | 8/1991 | Yokoi ............................ | 347/30 |
| 5,055,861 A | * | 10/1991 | Murayama et al. ............. | 347/29 |
| 5,682,186 A | * | 10/1997 | Bohorquez et al. ........... | 347/29 |
| 5,831,644 A | | 11/1998 | Kato | |
| 6,142,602 A | * | 11/2000 | Tanaka ......................... | 347/29 |
| 6,183,060 B1 | * | 2/2001 | Tokuda ......................... | 347/33 |

FOREIGN PATENT DOCUMENTS

| | | | | |
|---|---|---|---|---|
| CA | 676291 | | 10/1995 | |
| JP | 2-45156 A | * | 2/1990 | .................. 347/32 |
| JP | 7-223320 | * | 2/1994 | ............ B41J/2/165 |
| JP | 7-009680 | | 1/1995 | |
| JP | 8-224865 | | 9/1996 | |
| JP | 9-076532 | | 3/1997 | |

* cited by examiner

*Primary Examiner*—David F. Yockey

(57) ABSTRACT

A compact printer having a printhead, a powered roller and a novel capping mechanism. The printhead prints on printable media that is passed adjacent to the printhead by the powered rollers. The capping mechanism has a pair of spaced apart capping arms that are bridged by a cap. The cap is moved between a position that protects the printhead and a position that enables the printhead to print on the media. The powered roller causes the capping arms to be moved between these positions and also moves the printable media past the printhead between the cap and the printhead.

40 Claims, 15 Drawing Sheets

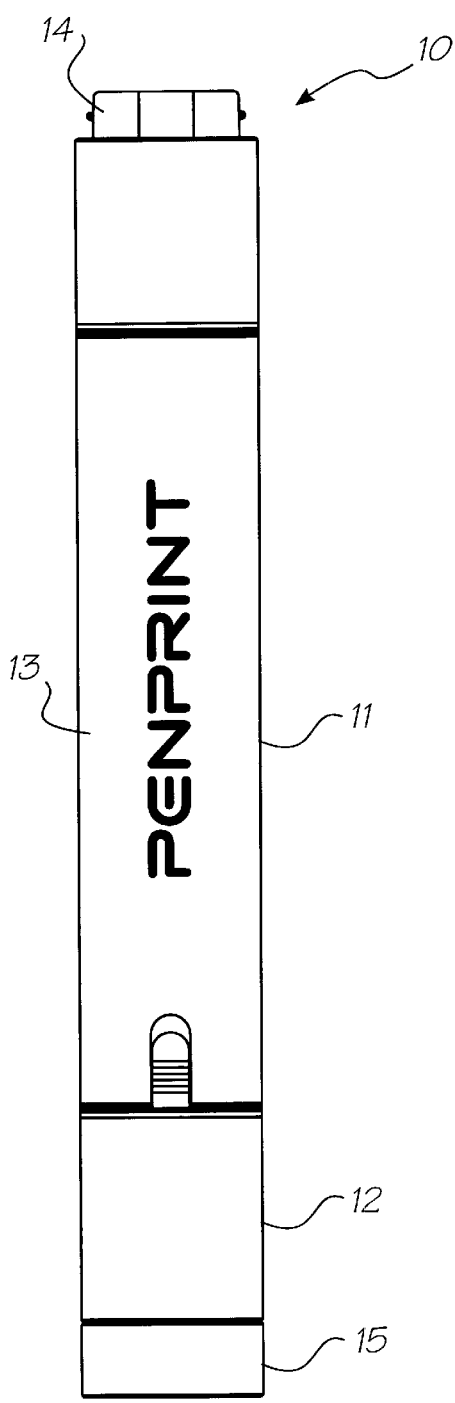
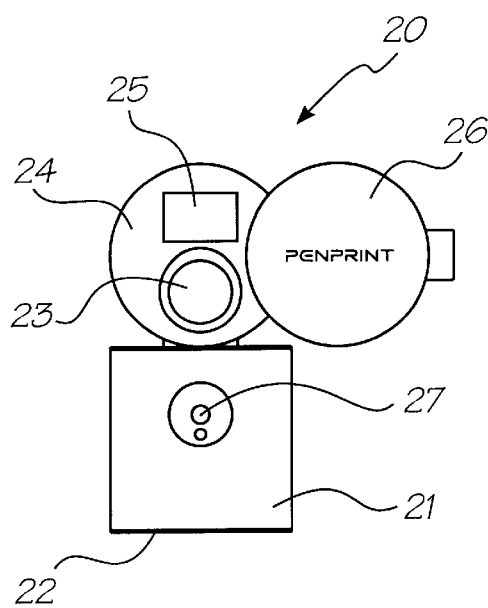
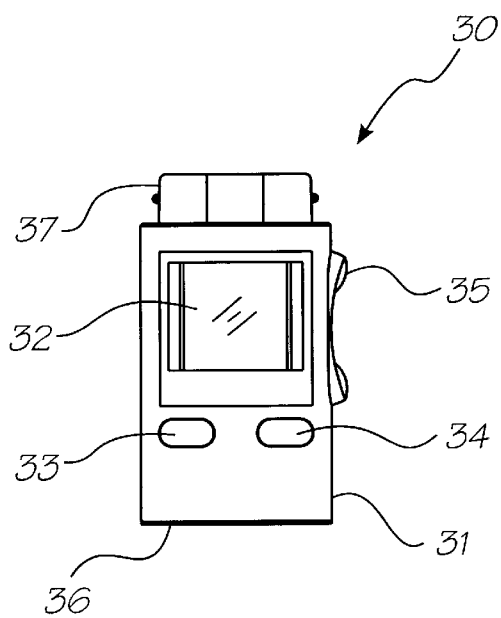

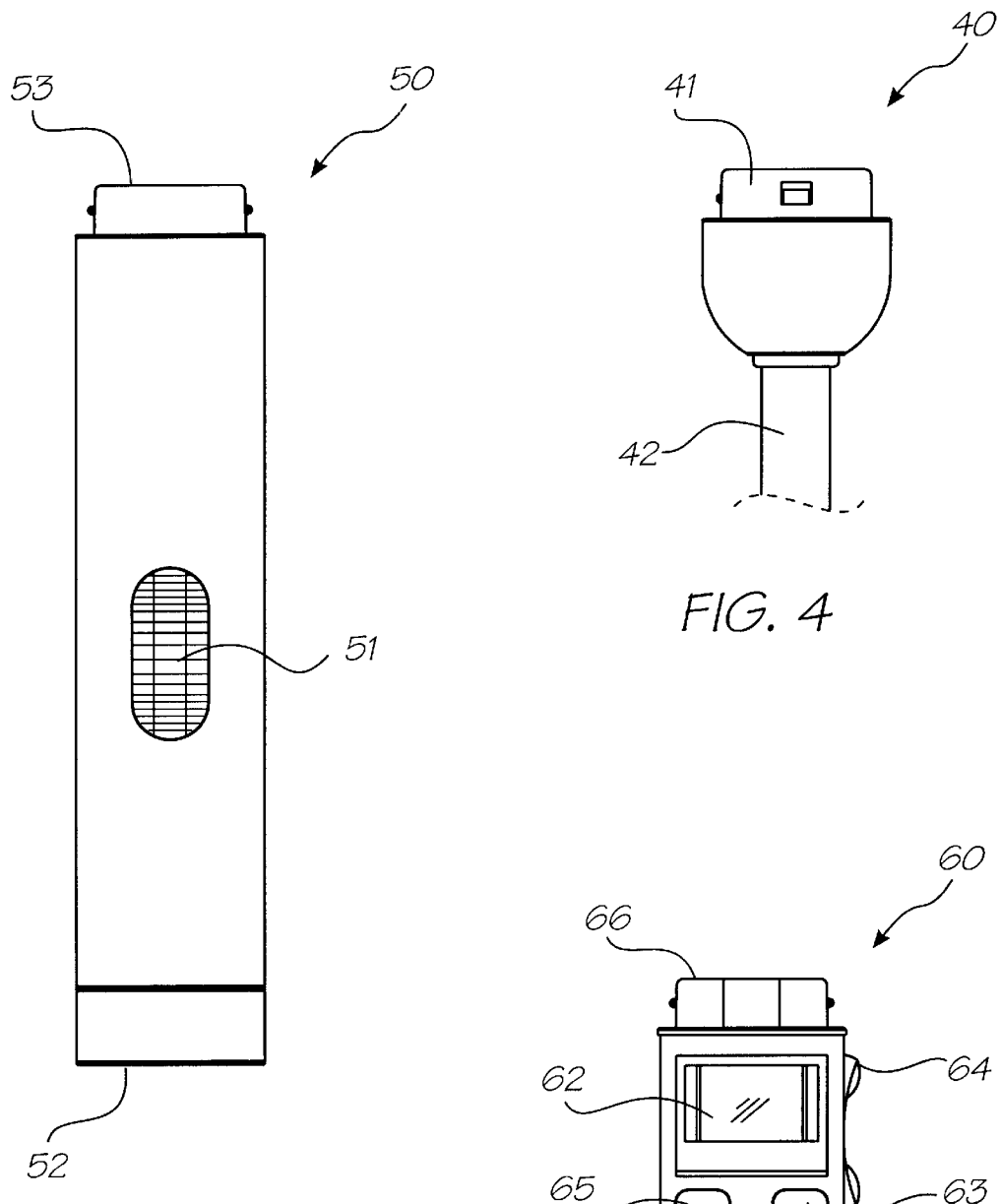

COMPACT PRINTER SYSTEM AND NOVEL CAPPING MECHANISM

FIELD OF THE INVENTION

The invention relates to a compact printer system able to print full-color, business card size documents from a device about the size of a pen. The system includes various hot-connectable modules that provide a range of functions. In particular the invention relates to a capping mechanism to prevent ink drying in the printer.

Reference may be had to co-pending applications claiming priority from Australian Provisional Patent Application number PQ0560 dated May 25, 1999. The co-pending applications describe related modules and methods for implementing the compact printer system. The co-pending applications are as follows:

| USSN       | Docket No. |
| ---------- | ---------- |
| 09/575,182 | PP01       |
| 09/575,173 | PP02       |
| 09/575,136 | PP04       |
| 09/575,119 | PP07       |
| 09/575,135 | PP08       |
| 09/575,157 | PP09       |
| 09/575,166 | PP10       |
| 09/575,134 | PP11       |
| 09/575,121 | PP12       |
| 09/575,137 | PP13       |
| 09/575,167 | PP15       |
| 09/575,120 | PP16       |
| 09/575,122 | PP17       |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States Patent Applications filed simultaneously to the present application and hereby incorporated by cross reference:

| USSN       | Docket No. |
| ---------- | ---------- |
| 09/575,152 | MJ62       |
| 09/575,141 | IJ52       |
| 09/575,125 | IJM52      |
| 09/575,176 | MJ63       |
| 09/575,147 | MJ58       |

Most color printers use ink for printing. The ink is selectively delivered through nozzles forming part of the printhead. Ink drying in the ink nozzles is a common problem with ink jet printers. It is, known to provide a cap for the nozzles to substantially prevent evaporation and thereby minimize the problems of dry ink blocking the nozzles. The problem causes particular difficulties in a compact printer due to the inaccessibility of the printhead.

The known capping mechanisms obstruct the paper path in printers having a stationary printhead and moving paper. While cleaning remains an option, it is preferable to prevent the problem of dry ink as far as possible.

SUMMARY OF THE INVENTION

In one form, the invention resides in a nozzle capping mechanism for a printhead of a compact printer having a powered roller for moving printable media past said printhead, said mechanism comprising:

at least one capping arm operativy associated with the powered roller; and a cap supported by said capping arm and movable with said capping arm between a position engaging the printhead and a position spaced from said printhead;

wherein said cap rests in contact with said printhead and the capping arm moves said cap away from said printhead when said powered roller rotates.

Further features of the invention will be evident from the following description.

BRIEF DESCRIPTION OF THE DRAWINGS

In order to assist with describing preferred embodiments of the invention, reference will be made to the following figures in which:

FIG. 1 is a printer module;

FIG. 2 is a camera module;

FIG. 3 is a memory module;

FIG. 4 is a communication module;

FIG. 5 is a flash module;

FIG. 6 is a timer module;

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any. order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 7:
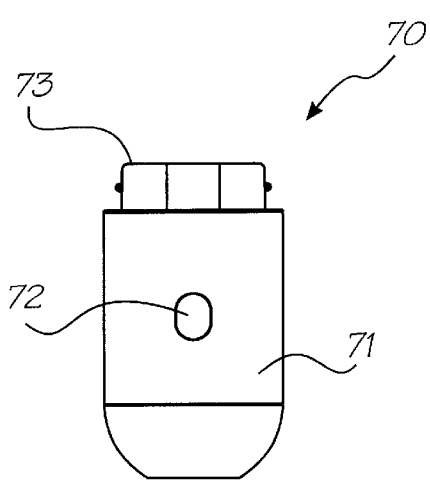
FIG. 7 is a laser module.

Compact printer modules can be grouped into three types:
image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;

housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

FIG. 1 shows a printer module that incorporates a compact printhead described in co-pending United States Patent Applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 $\mu$m in diameter, and spaced 15.875 $\mu$m apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images, captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
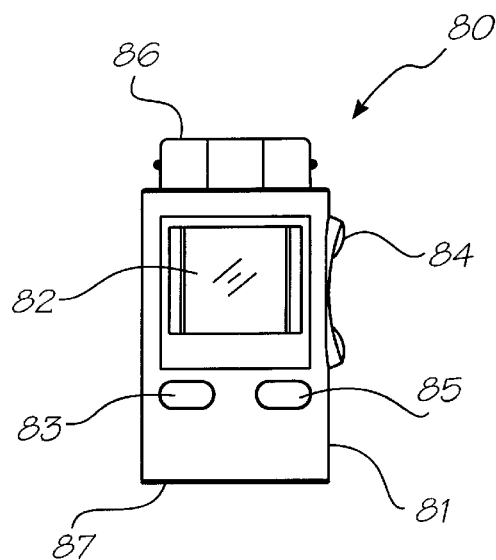
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
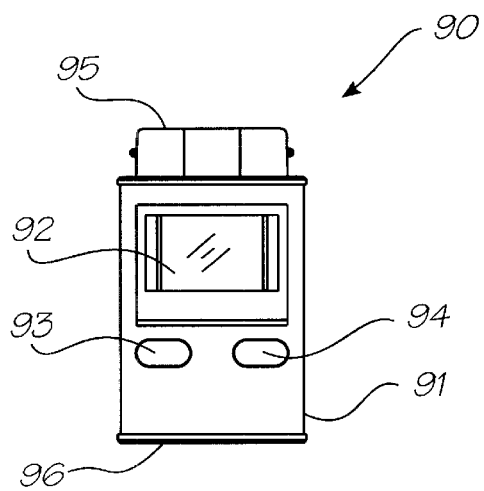
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
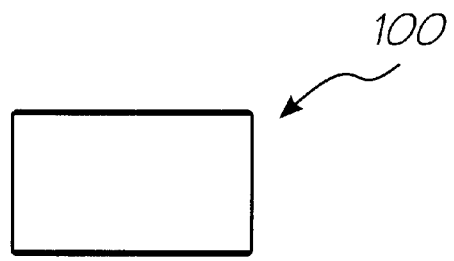
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
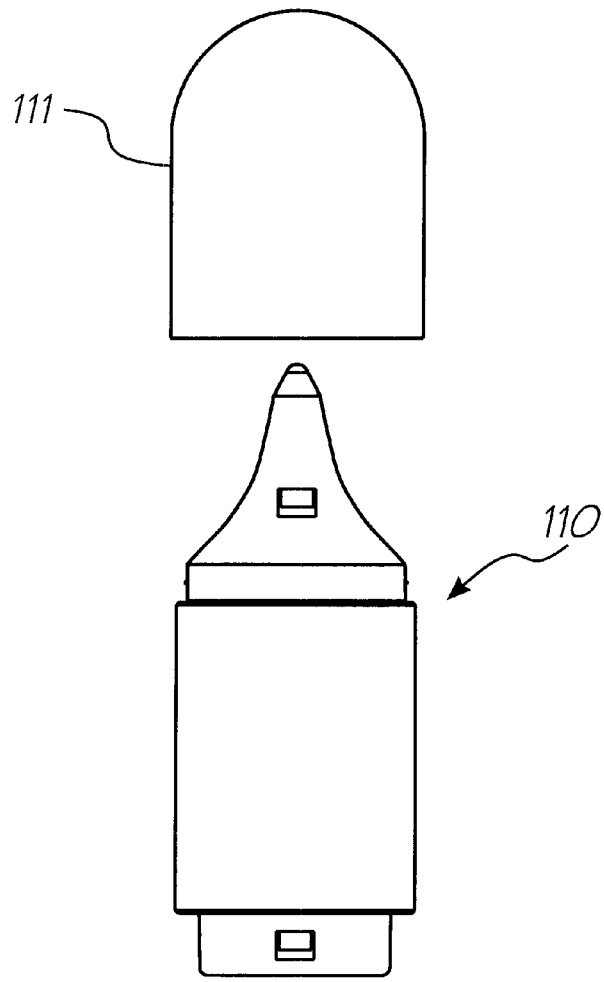
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
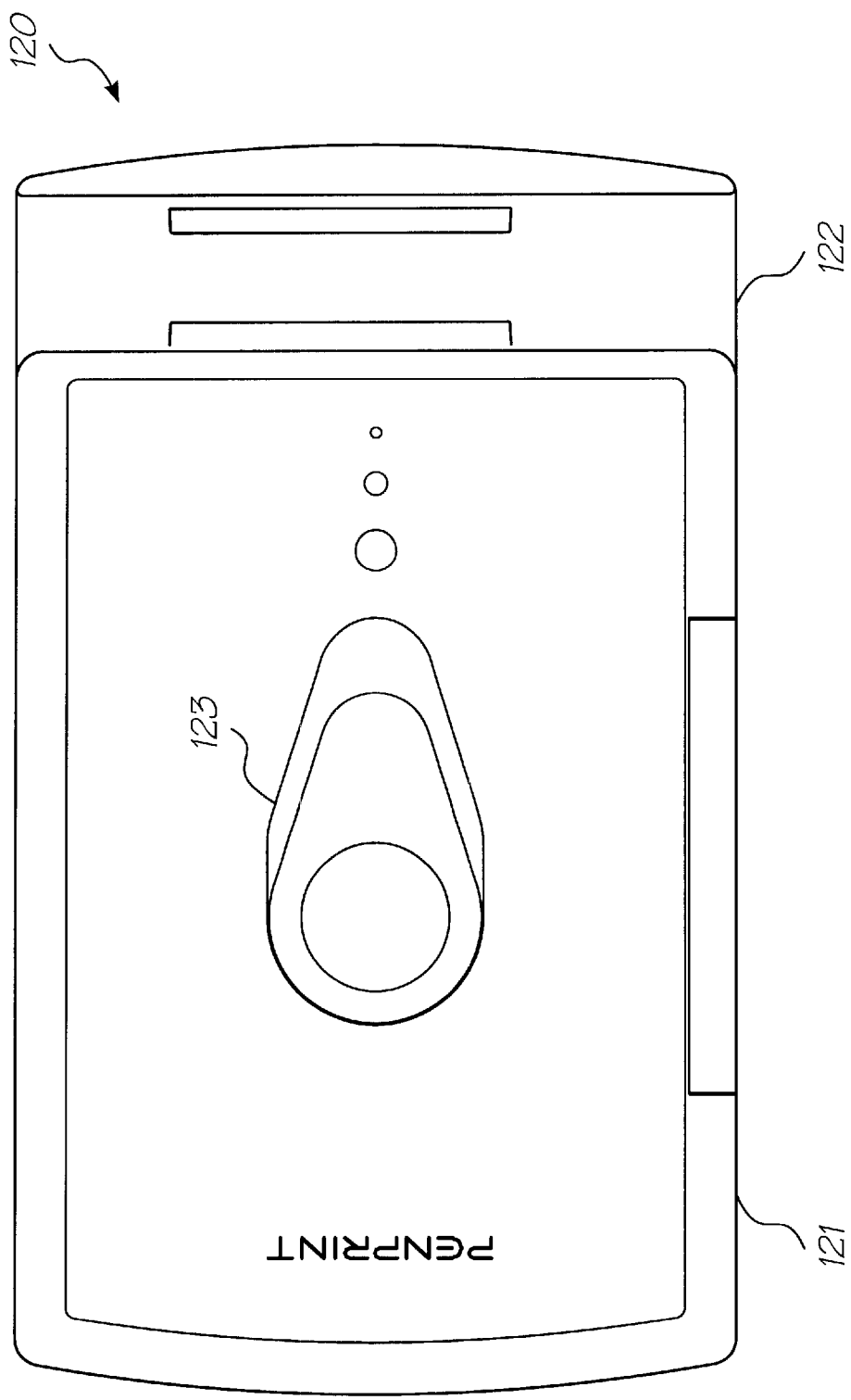
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
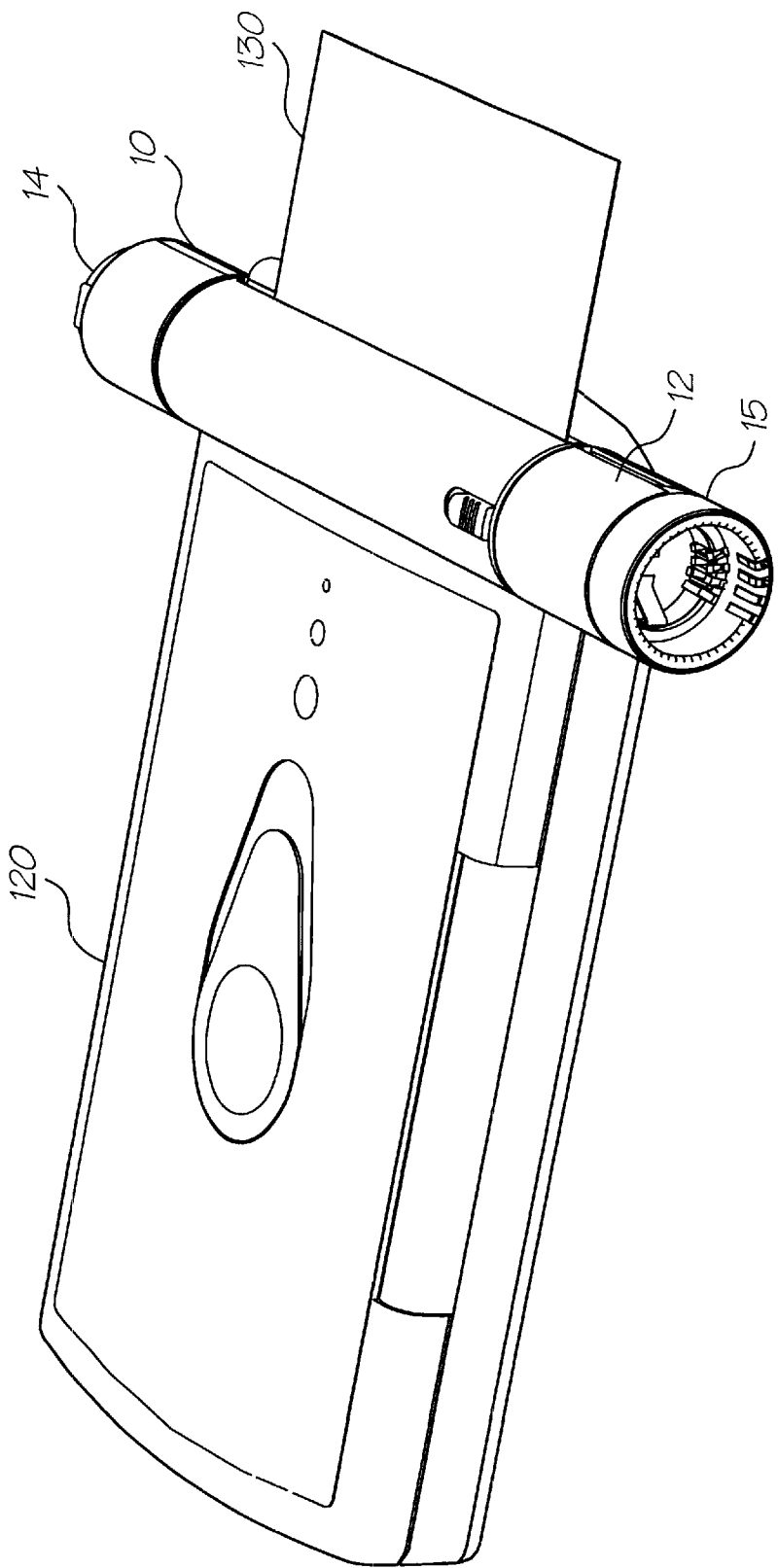
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
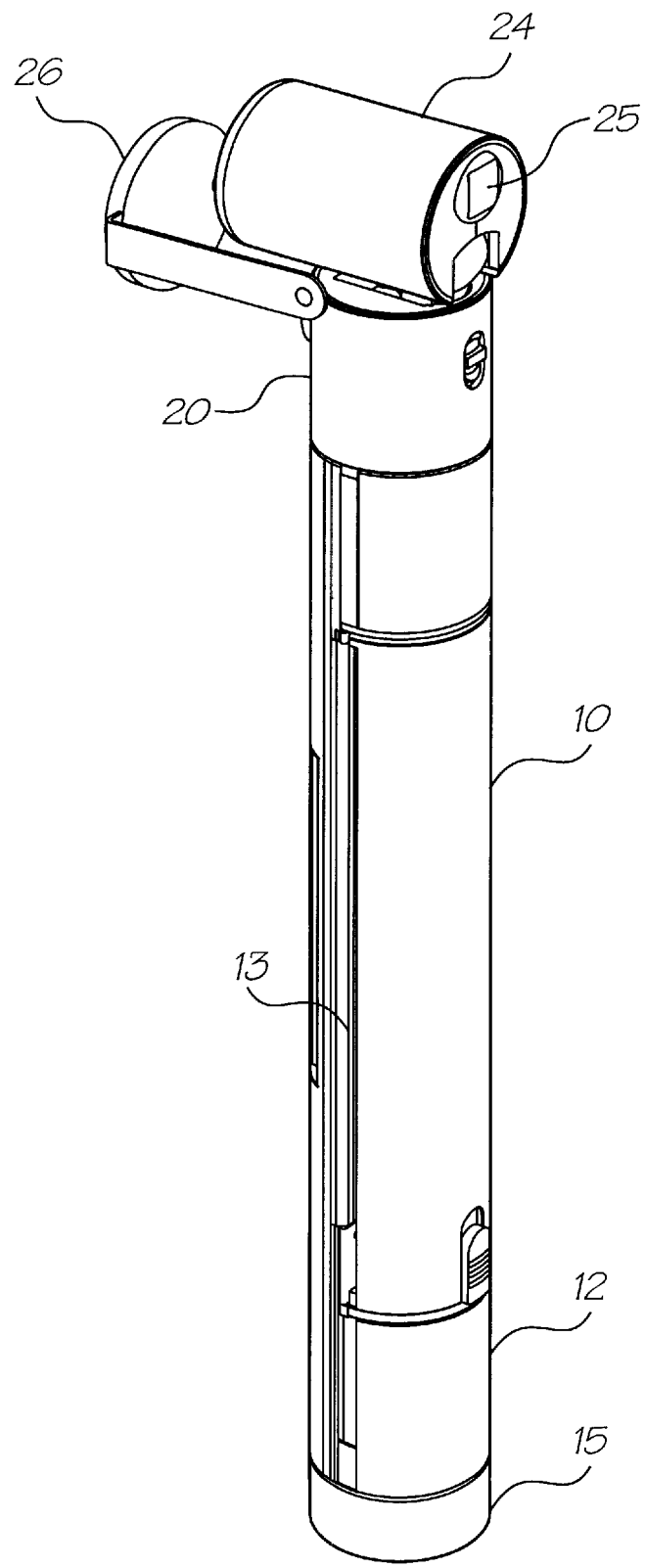
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
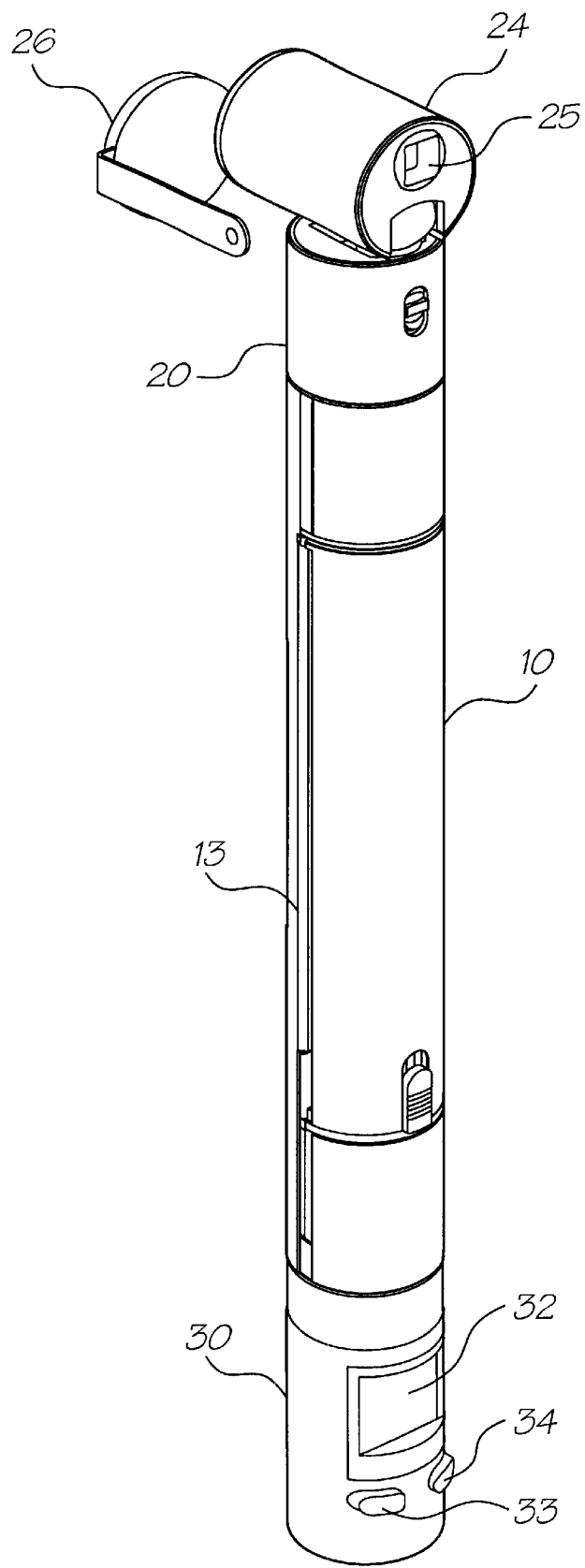
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
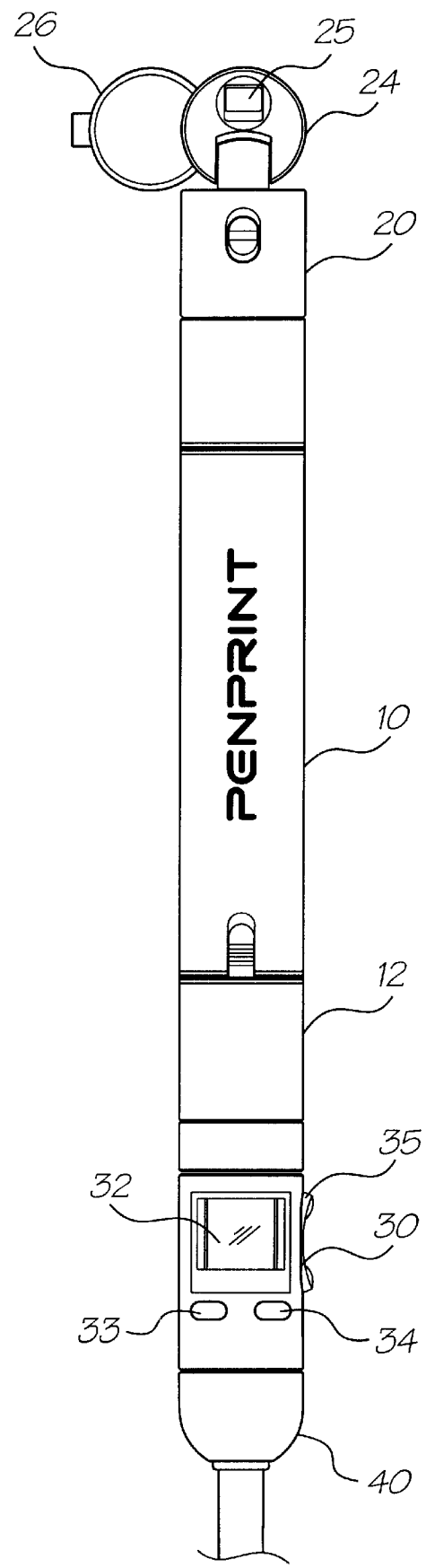
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

Figure 17:
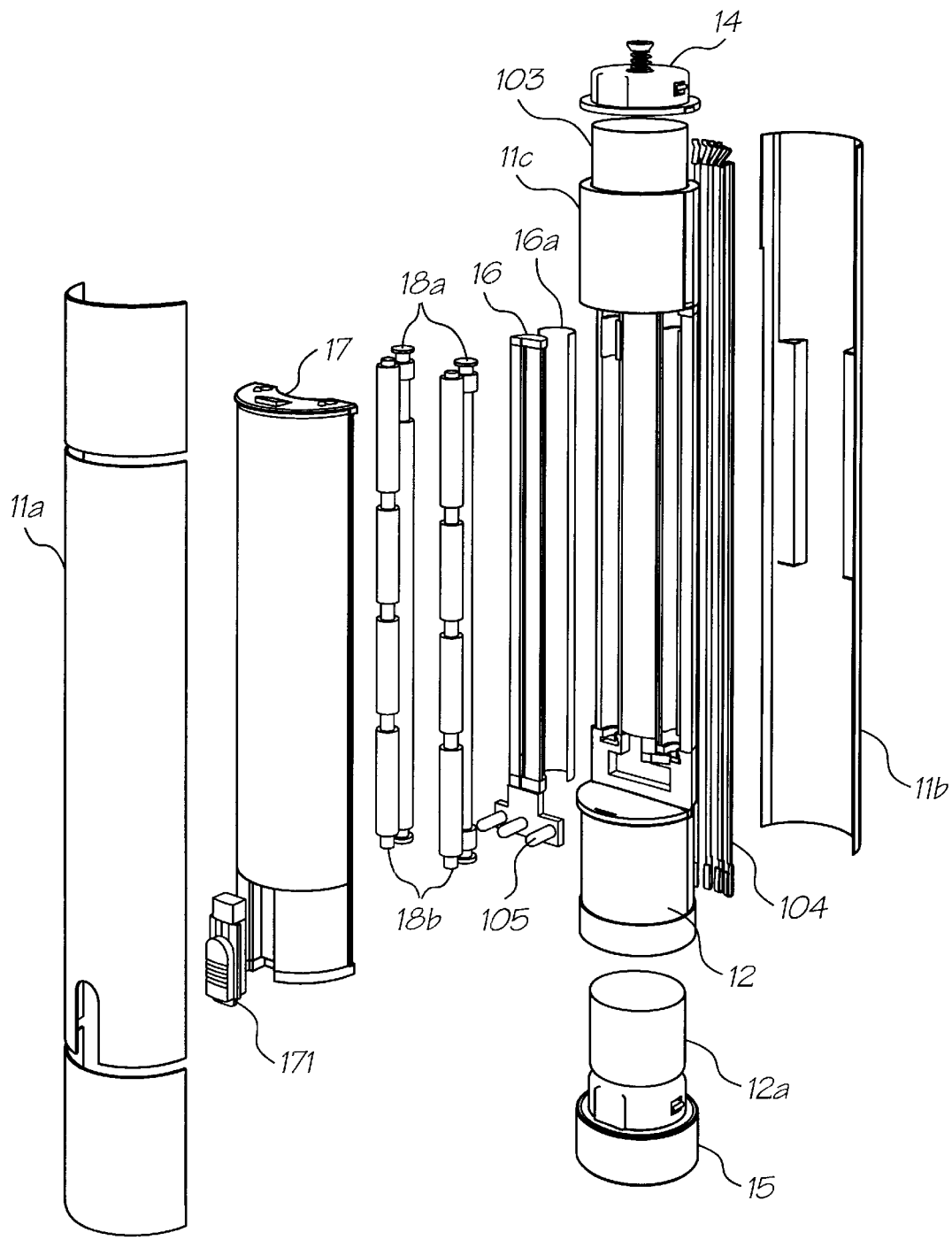
FIG. 17 is an exploded view of the Printer Module of FIG. 1.
Figure 18:
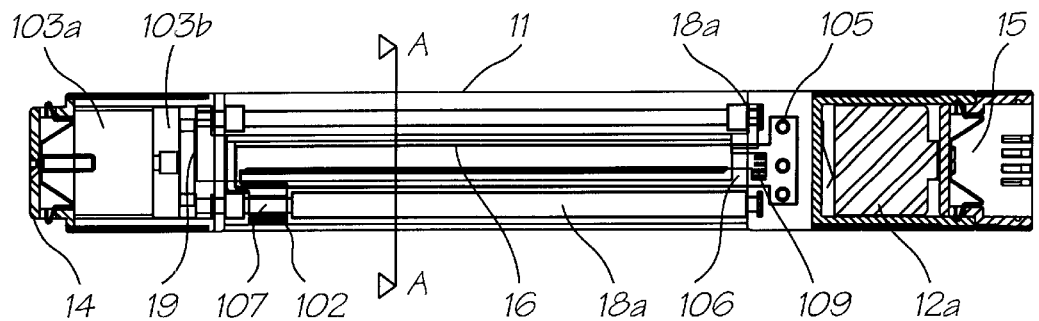
FIG. 18 is a top view of the Printer Module with ink cartridge removed.

Detailed views of the Printer Module 10 are shown in FIGS. 17 and 18. The Printer Module 10 is the central. module in the compact printer system. It contains a 2-inch Memjet printhead 16, a Cyan/Magenta/Yellow ink cartridge 17, the current image, stored in flash memory on the printhead and a power source in the form of a 3V battery 12a in the battery compartment 12. With regards to processing, the Printer Module 10 contains a controller 101 that incorporates an image processing chip to print the stored image in high quality, and a QA chip for ensuring the ink cartridge 17 does not run dry.

The Printer Module 10 can, be used as a stand-alone printer of a single image (such as business cards), or can be used in conjunction with other modules to print a variety of images.

Looking in detail at FIG. 17, the body 11 of the printer module is in three parts being a lid 11a, base 11b and chassis 11c. Printhead 16 with filter 16a fits into the chassis 11c. Powered rollers 18a are driven by motor and gearbox 103. Neutral rollers 18b fit into ink cartridge 17 and guide a card past the printhead 16. Springs 18c (FIG. 19) urge the neutral rollers 18b towards the powered rollers 18a. The ink cartridge 17 is located beyond the rollers 18 so that the card passes between the printhead 16 and the ink cartridge 17. Ink inlets 105 provide communication between the ink cartridge 17 and the printhead 16. Micro-moulded channels 106 in the chassis 11c distribute the ink from the ink inlets 105 to the length of the printhead 16.

Serial bus 104 provides power and data between the printer module 10 and other modules connected to male connector 14 and female connector 15. The serial bus 104 picks up power from the battery 12a and signals from the controller 101.

Figure 19:
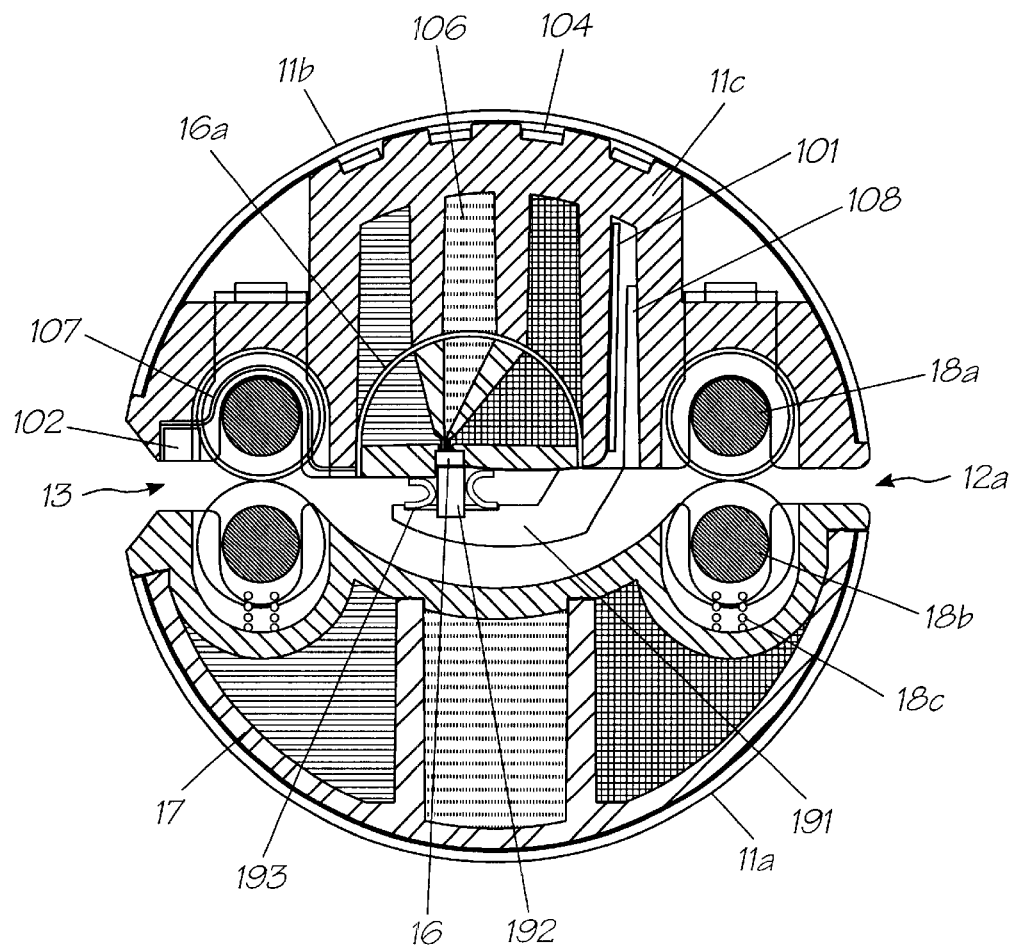
FIG. 19 is a cross-sectional view through AA in FIG. 18.
Figure 20:
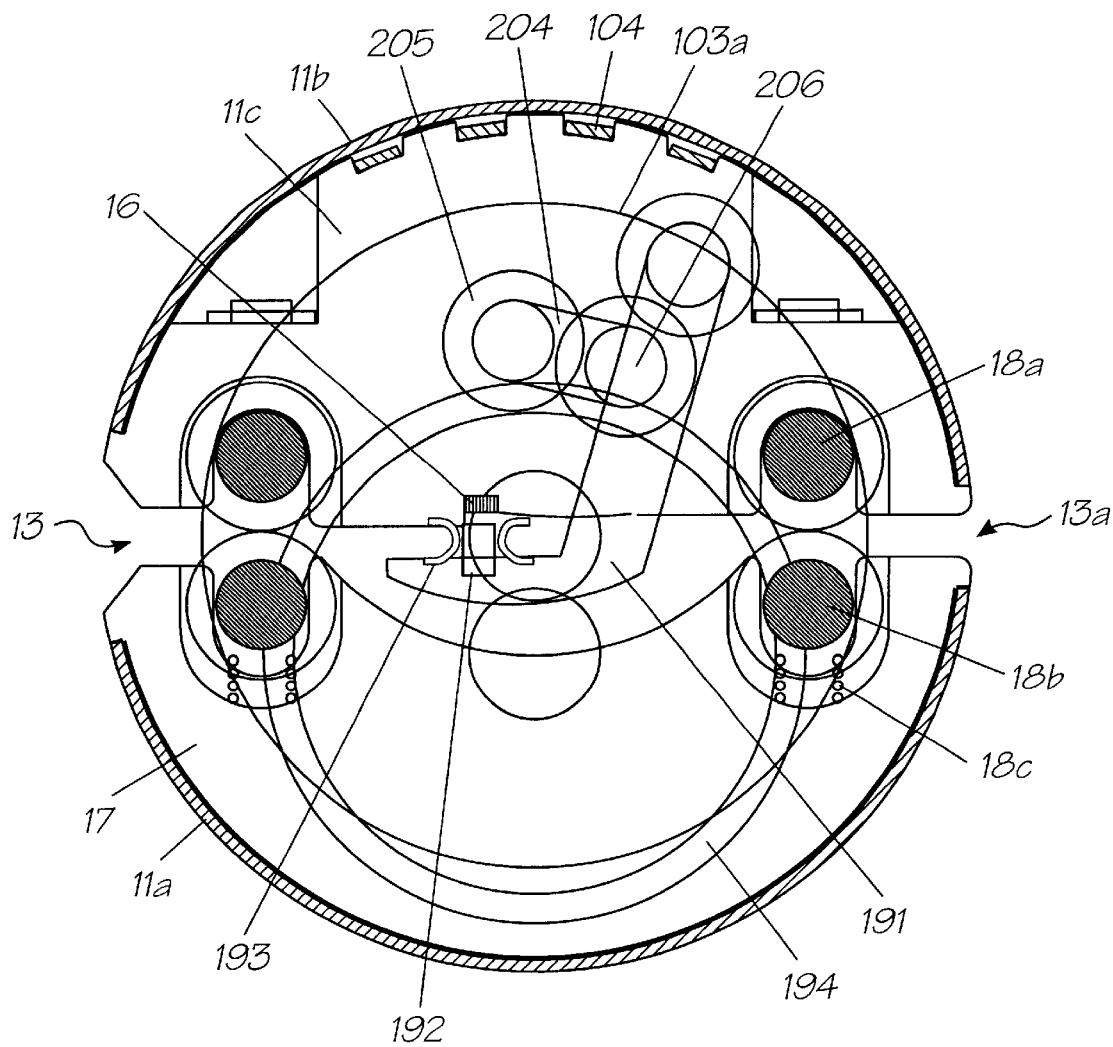
FIG. 20 is an embodiment of a nozzle capping mechanism.
Figure 21:
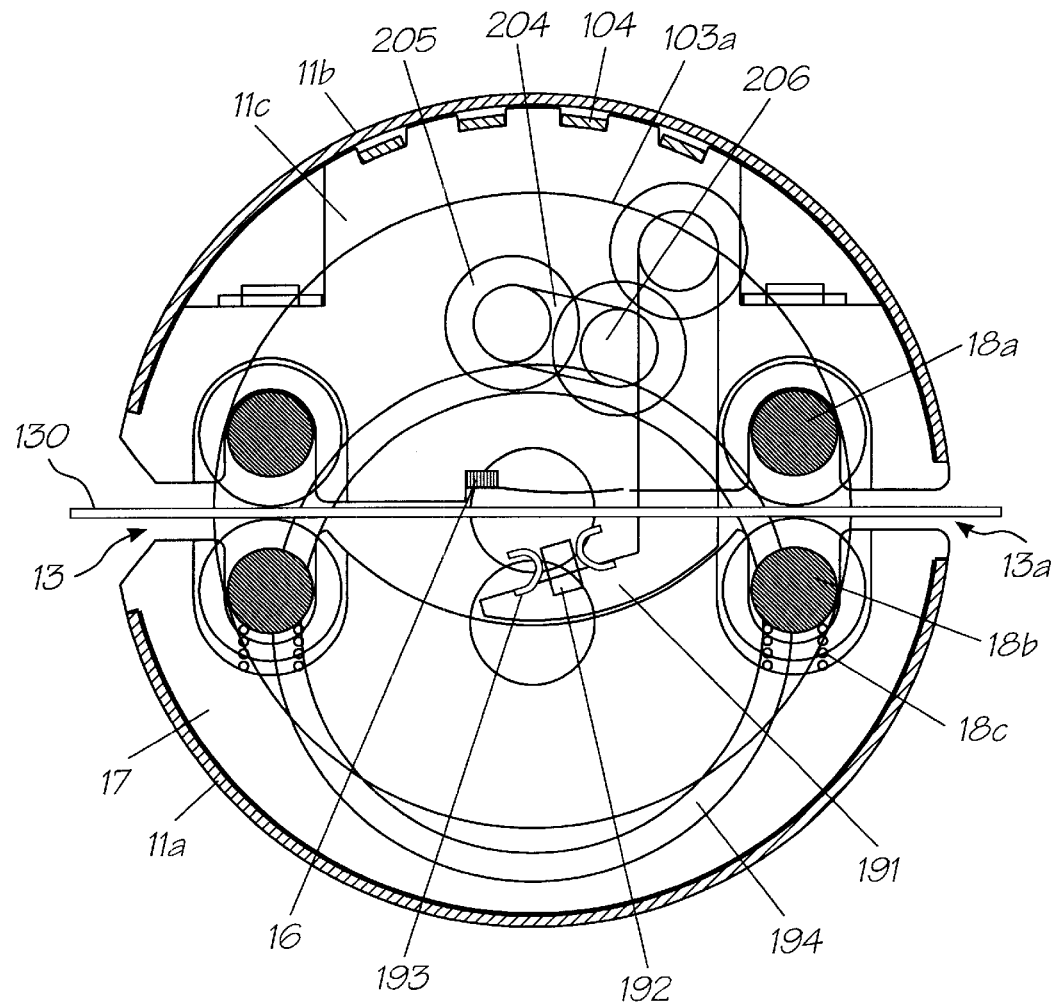
FIG. 21 shows the embodiment of FIG. 20 in an uncapped state.
Figure 22:
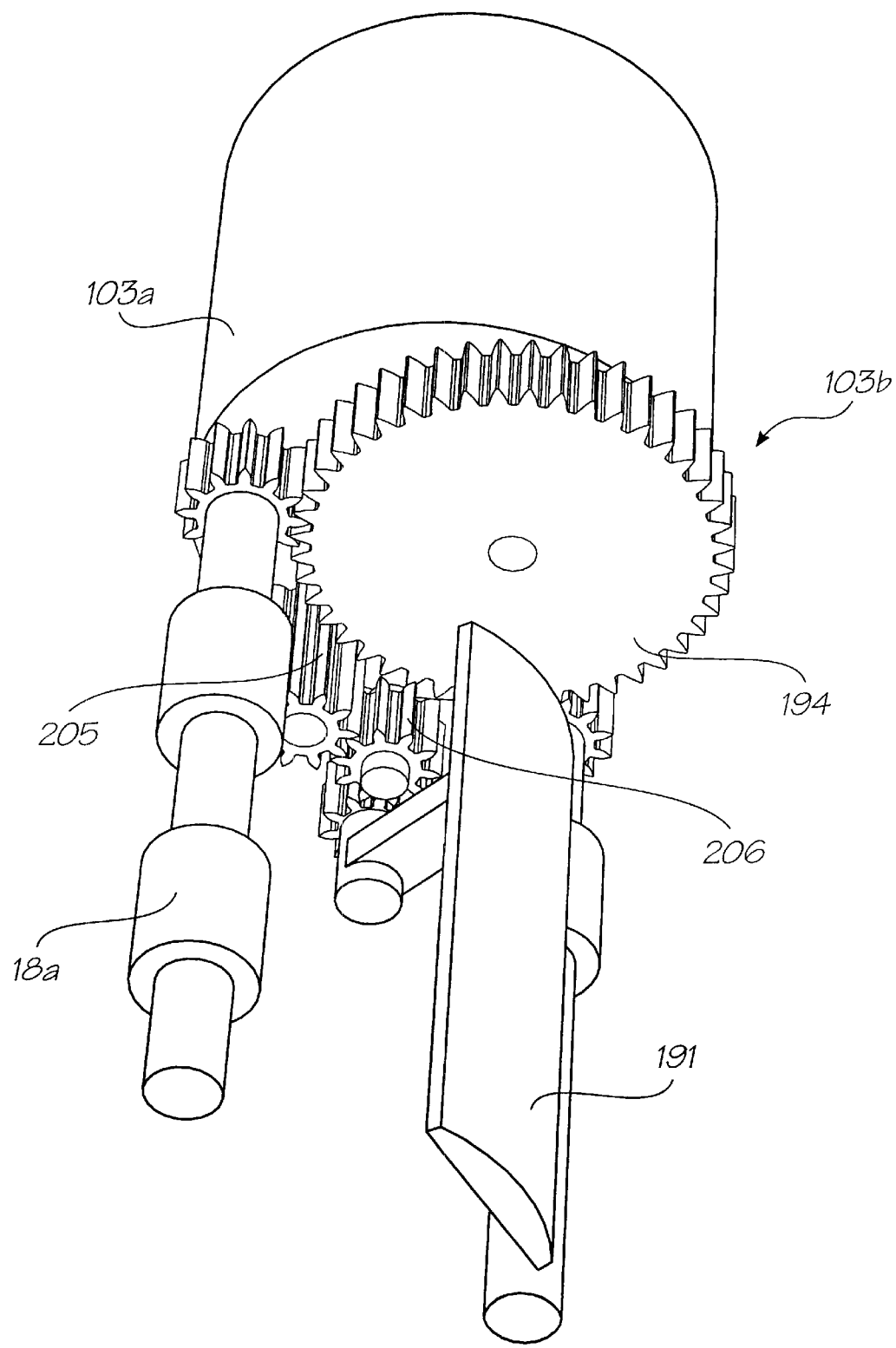
FIG. 22 shows the underside of the drive assembly of the Printer Module of FIG. 1.
Figure 23:
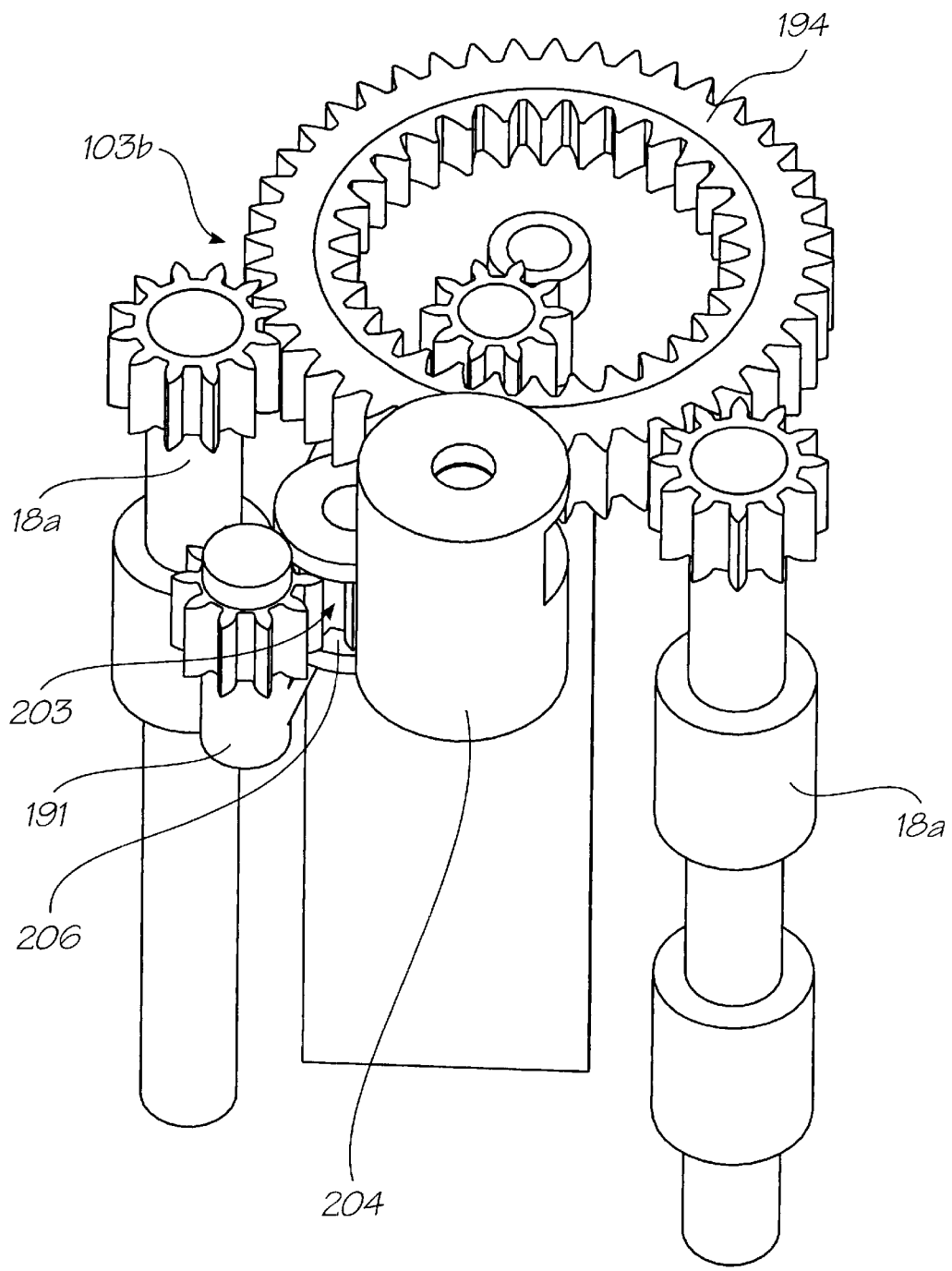
FIG. 23 shows a top three quarter view of the drive assembly of FIG. 22.

Looking at FIG. 19, to print an image, a user simply inserts a business card into the input slot 13 of the Printer Module. Sensor 102 detects the insertion and the motor and gearbox 103 activates powered rollers 18a to carry the card through the module with neutral rollers 18b. A tab film 107 provides signal connection from the sensor 102 to the controller 101 and hence to the motor and gearbox 103. A wedge 108 holds the tab film 107 against the controller 101 to make a signal connection.

The printed card is ejected from the output slot 13a of the module over a time period of 1 second. There is no on/off switch—the act of inserting the card is the effective "on" switch for the duration of a print.

To reduce the chance of ink drying in the printhead 16 a capping mechanism 19 is provided to cap the ink nozzles in the printhead. The capping mechanism 19 comprises a capping arm 191 supporting a cap in the form of adjacent elastomeric seals 193. The elastomeric seals are suitably formed as a continuous elastomeric ring that is glued to the end of the capping arm. A blotter 192 is located at the end of the capping arm between the seals. The blotter soaks up ink ejected from the printhead during cleaning.

As shown in FIGS. 20 to 23, a drive gear 194 is operatively associated with both of the powered rollers 18a to move the capping arm. 191 out of the path of the card for printing. The drive gear 194 is driven directly by the motor 103a and powers both drive rollers 18a. The capping arm 191 is moved away from the printhead 16 when a reversing gear assembly 203 is activated. The reversing gear assembly consists plastic molded housing 204 and two gears. The longer transmission gear 205 engages with the main drive gear 194 and in one direction powers the second smaller reversing gear 206 around to make contact with gear on the end of the capping arm 201. These act together to pivot the capping arm away and uncap the printhead 16. When printing is finished, the main gear 194 is reversed, which reverses the drive rollers and pivots the capping arm 191 to the home position after it is engaged by the reversing gear assembly 203. It rotates back towards the printhead 16 until the elastomeric seals 193 seal either side of the printhead 16. The elastomeric seals 193 maintain a moist environment in the vicinity of the printhead.

As shown in FIGS. 20 to 23, the ink cartridge 17 is shaped to receive the capping arm 191 out of the path of the printable media. There is a capping arm at each end of the printhead with the cap extending between the capping arms. Each capping arm is separated by a space sufficient to allow the passage of the card being printed.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

What is claimed is:

1. A compact printer comprising:
    a fixed printhead for printing printable media;
    at least one powered roller moving said printable media past said printhead; and
    a nozzle capping mechanism having a pair of spaced apart capping arms bridged by a cap;
    said capping arms operatively associated with said powered roller, said powered roller rotating to move the cap between a position protecting the fixed printhead and a position enabling the printhead to print on said printable media wherein said powered roller rotates to move said printable media past said printhead between said cap and said printhead.

2. The compact printer of claim 1 further comprising a clutch providing said operative association between said capping arms and said powered roller.

3. The compact printer of claim 2 wherein the clutch is a frictional clutch.

4. The compact printer of claim 1 further comprising a motive device associated with said capping arm, said motive device moving said capping arms when said powered roller rotates.

5. The compact printer of claim 4 wherein said motive device is a solenoid.

6. The compact printer of claim 4 wherein said motive device is a gear between said at least one powered roller and said capping arms.

7. The compact printer of claim 1 wherein the cap comprises one or more seals that locate adjacent said fixed printhead.

8. The compact printer of claim 7 wherein there is a single seal that locates either side around said fixed printhead.

9. The compact printer of claim 7 wherein said one or more seals are elastomeric seals.

10. The compact printer of claim 1 wherein said cap comprises one or more seals that locate adjacent said printhead and a blotter that locates near said fixed printhead.

11. A compact printer comprising:
at least one powered roller for moving printable media past a fixed printhead; and
a nozzle capping mechanism for capping the fixed printhead, the nozzle capping mechanism having:
a pair of capping arms with at least one capping arm operatively associated with the powered roller; and
a cap supported by said capping arm movable with said capping arm between a first position protecting the printhead and a second position spaced from said printhead;
wherein said cap rests adjacent said fixed printhead in said first position and the capping arm moves said cap away from said printhead to said second position when said powered roller rotates;
and wherein printable media is passed by said powered roller between said cap and said fixed printhead and between said capping arms when the capping arms are in said second position.

12. The compact printer or claim 11 further comprising a clutch providing said operative association between said at least one capping arm and said powered roller.

13. The compact printer of claim 12 wherein the clutch is a frictional clutch.

14. The compact printer of claim 11 further comprising a motive device associated with said capping arm, said motive device moving said capping arm when said powered roller rotates.

15. The compact printer of claim 14 wherein said motive device is a solenoid.

16. The compact printer of claim 14 wherein said motive device is a gear between said at least one powered roller and said capping arm.

17. The compact printer of claim 11 wherein the cap comprises one or more seals that locate adjacent said fixed printhead.

18. The compact printer of claim 17 wherein there is a single seal that locates either side around said fixed printhead.

19. The compact printer of claim 17 wherein said one or more seals are elastomeric seals.

20. The compact printer of claim 11 wherein said cap comprises one or more seals that locate adjacent said printhead and a blotter that locates near said fixed printhead.

21. A nozzle capping mechanism for a printer having a fixed printhead that prints onto printable media, said nozzle capping mechanism comprising:
a pair of spaced apart capping arms bridged by a cap;
at least one powered roller operatively associated with said capping arms to move said cap between a first position protecting the fixed printhead and a second position enabling the printhead to print on said printable media as said printable media moves past said printhead between said cap and said printhead;
wherein said powered roller rotates in a first direction to move said cap to said position and passes said printable media between said cap and said printhead to enable the printhead to print on said printable media, and said powered roller rotates in an opposite direction to move said cap to said position protecting the fixed printhead.

22. The nozzle capping mechanism of claim 21 further comprising a clutch providing said operative association between said capping arms and said powered roller.

23. The nozzle capping mechanism of claim 22 wherein the clutch is a frictional clutch.

24. The nozzle capping mechanism of claim 21 further comprising a motive device associated with said capping arms, said motive device moving said capping arm when said powered roller rotates.

25. The nozzle capping mechanism of claim 24 wherein said motive device is a solenoid.

26. The nozzle capping mechanism of claim 24 wherein said motive device is a gear between said at least one powered roller and said capping ails.

27. The nozzle capping mechanism of claim 21 wherein the cap comprises one or more seals that locate adjacent said fixed printhead.

28. The nozzle capping mechanism of claim 27 wherein there is a single seal that locates either side around said fixed printhead.

29. The nozzle capping mechanism of claim 27 wherein said one or more seals are elastomeric seals.

30. The nozzle capping mechanism of claim 21 wherein said cap comprises one or more seals that locate adjacent said printhead and a blotter that locates near said fixed printhead.

31. A nozzle capping mechanism for a fixed printhead of a compact printer, said mechanism comprising:
at least one powered roller for moving printable media past said printhead
a pair of spaced apart capping arms operatively associated with the powered roller; and
a cap bridging said capping arms and movable with said capping arm between a first position protecting the fixed printhead and a second position spaced from said printhead;
wherein said cap resting adjacent said fixed printhead in said first position and the capping arm move said cap away from said fixed printhead when said powered roller rotates;
and wherein printable media is fed by the powered roller between the spaced apart capping arms when the capping arms are in the second position.

32. The nozzle capping mechanism of claim 31 further comprising a clutch providing said operative association between said capping arms and said powered roller.

33. The nozzle capping mechanism of claim 32 wherein the clutch is a frictional clutch.

34. The nozzle capping mechanism of claim 31 further comprising a motive device associated with said capping arms, said motive device moving said capping arms when said powered roller rotates.

35. The nozzle capping mechanism of claim 34 wherein said motive device is a solenoid.

36. The nozzle capping mechanism of claim 34 wherein said motive device is a gear between said at least one powered roller and said capping arms.

37. The nozzle capping mechanism of claim 31 wherein the cap comprises one or more seals that locate adjacent said fixed printhead.

38. The nozzle capping mechanism of claim 37 wherein there is a single seal that locales either side around said fixed printhead.

39. The nozzle capping mechanism of claim 37 wherein said one or more seals are elastomeric seals.

40. The nozzle capping mechanism of claim 31 wherein said cap comprises one or more seals that locate adjacent said printhead and a blotter that locates near said fixed printhead.

* * * * *

UNITED STATES PATENT AND TRADEMARK OFFICE
CERTIFICATE OF CORRECTION

PATENT NO. : 6,416,160 B1
DATED : July 9, 2002
INVENTOR(S) : Kia Silverbrook

It is certified that error appears in the above-identified patent and that said Letters Patent is hereby corrected as shown below:

Column 10,
Line 32, should read as follows:
26.   The nozzle capping mechanism of claim 35 wherein said motive device is a gear between said at least one powered roller and said capping arms.

Signed and Sealed this

Seventeenth Day of December, 2002

JAMES E. ROGAN
*Director of the United States Patent and Trademark Office*